(12) United States Patent
Tao et al.

(10) Patent No.: US 10,789,934 B2
(45) Date of Patent: Sep. 29, 2020

(54) ACTIVE NOISE REDUCTION DEVICE AND ACTIVE NOISE REDUCTION METHOD

(71) Applicant: Panasonic Intellectual Property Management Co., Ltd., Osaka (JP)

(72) Inventors: Masafumi Tao, Kanagawa (JP); Tomofumi Yamanashi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/559,660

(22) Filed: Sep. 4, 2019

(65) Prior Publication Data

US 2020/0005760 A1 Jan. 2, 2020

Related U.S. Application Data

(63) Continuation of application No. PCT/JP2018/005644, filed on Feb. 19, 2018.

(30) Foreign Application Priority Data

Mar. 16, 2017 (JP) .................................. 2017-051271

(51) Int. Cl.
G10K 11/178 (2006.01)
(52) U.S. Cl.
CPC .. *G10K 11/17854* (2018.01); *G10K 11/17823* (2018.01); *G10K 11/17825* (2018.01);
(Continued)
(58) Field of Classification Search
CPC ....... G10K 11/17854; G10K 11/17823; G10K 11/17879; G10K 11/17825; G10K 2210/3028; G10K 2210/3044
See application file for complete search history.

(56) References Cited

U.S. PATENT DOCUMENTS 5,325,437 A * 6/1994 Doi ...................... G10K 11/178
381/71.9
2013/0136269 A1* 5/2013 Sakamoto ............ G10K 11/178
381/71.4
(Continued)

FOREIGN PATENT DOCUMENTS

JP 3-178845 8/1991
JP 7-219563 8/1995
(Continued)

OTHER PUBLICATIONS

International Search Report of PCT application No. PCT/JP2018/005644 dated May 1, 2018.

*Primary Examiner* — Andrew L Sniezek
(74) *Attorney, Agent, or Firm* — Greenblum & Bernstein, P.L.C.

(57) ABSTRACT

An active noise reduction device includes a standard signal generator, an adaptive filter unit, a control sound output unit, and an error signal detector. The adaptive filter unit includes a control signal generator, a filter coefficient update unit, and a step size setting unit. The control signal generator multiplies a standard signal by a filter coefficient to generate a control signal. Based on a reference signal and an error signal, the filter coefficient update unit updates the filter coefficient so as to minimize the error signal. The step size determiner sets a step size parameter indicating an update amount of the filter coefficient. The filter coefficient update unit sets a step size adjustment coefficient for adjusting the step size parameter based on an audio information feature amount and a change of the control signal.

7 Claims, 2 Drawing Sheets

(52) U.S. Cl.
CPC ............... *G10K 11/17879* (2018.01); *G10K 2210/3028* (2013.01); *G10K 2210/3044* (2013.01)

(56) References Cited

U.S. PATENT DOCUMENTS

| | | | |
|---|---|---|---|
| 2015/0104030 A1* | 4/2015 | Ueno | G10K 11/178 |
| | | | 381/71.4 |
| 2015/0334490 A1* | 11/2015 | Pan | G10K 11/17854 |
| | | | 381/71.4 |
| 2016/0012815 A1* | 1/2016 | Yano | G10K 11/17833 |
| | | | 381/71.11 |
| 2016/0284337 A1* | 9/2016 | Inoue | G10K 11/17883 |
| 2017/0178617 A1* | 6/2017 | Christoph | G10K 11/17853 |

FOREIGN PATENT DOCUMENTS

| | | |
|---|---|---|
| JP | 2008-213755 | 9/2008 |
| JP | 2010-111206 | 5/2010 |

* cited by examiner

ACTIVE NOISE REDUCTION DEVICE AND ACTIVE NOISE REDUCTION METHOD

CROSS-REFERENCE TO RELATED APPLICATIONS

This application is a continuation of the PCT International Application No. PCT/JP2018/005644 filed on Feb. 19, 2018, which claims the benefit of foreign priority of Japanese patent application No. 2017-051271 filed on Mar. 16, 2017, the contents all of which are incorporated herein by reference.

TECHNICAL FIELD

The present invention relates to an active noise reduction device and an active noise reduction method for actively reducing an engine booming noise generated in a vehicle cabin due to an engine vibration of a moving body.

BACKGROUND ART

In recent years, the active noise reduction device that reduces the engine booming noise generated in the vehicle cabin of a running vehicle is put into practical use. The active noise reduction device reduces the engine booming noise by causing a control sound having an opposite phase and an identical amplitude to interfere with the engine booming noise. The engine booming noise is a radiation sound having noticeable periodicity in synchronization with a rotation rate of the engine. The engine vibration is transferred through a vehicle body, and the vehicle cabin that is a closed space induces resonance under a certain condition to generate the radiation sound.

The active noise reduction device includes an adaptive filter that adapts a transfer function in an engine vibration transfer system to itself to generate signal Y(n) for a control sound (hereinafter, referred to as "control signal Y(n)") that should be emitted to a control point. The adaptive filter includes a control signal generator that generates control signal Y(n) and a filter coefficient update unit that updates filter coefficient W(n) for the control signal generator.

In the feedforward control system adaptive filter, for example, the control signal generator generates control signal Y(n) by multiplying standard signal X(n) based on an engine pulse by filter coefficient W(n). The control sound corresponding to control signal Y(n) is emitted to the control point. The filter coefficient update unit successively updates filter coefficient W(n) so as to decrease error signal E(n) based on signal E(n) corresponding to a residual noise remaining at the control point (a difference between a control target sound and the control sound, hereinafter referred to as "error signal E(n)") and reference signal R(n). An optimization algorithm such as a Least Mean Square (LMS) algorithm is applied to the filter coefficient update unit.

When the adaptive filter has a tap length of "1", namely, for the 1-tap adaptive filter, filter coefficient W(n+1) at a sampling time (n+1) (n is a positive integer) data is measured at constant intervals is given by the following Formula (1). In Formula (1), p is a parameter that controls an update amount of filter coefficient W(n), namely, a convergence rate, and is called a step size parameter. When step size parameter μ is decreased, convergence accuracy is improved while the convergence rate becomes slow.

[Mathematical Formula 1]

$$W(n+1) = W(n) - \mu \cdot E(n) \cdot R(n) \quad (1)$$

Standard signal X(n) used in the active noise reduction device ordinarily includes a high-order frequency component at a frequency (engine rotation rate [rpm]/60 [sec], hereinafter referred to as a "fundamental frequency") equivalent to an engine rotation rate. For example, for an in-line 4-cylinder engine, because explosion is generated four times during two revolutions of a crankshaft, an even-numbered harmonic component, namely, a 2N-order component (N is a positive integer) of the fundamental frequency becomes a main component of standard signal X(n). That is, standard signal X(n) includes a second-order component that constitutes a fundamental wave, a fourth-order component, a sixth-order component, and the like that constitute harmonic waves. Conventionally control signal Y(n) is generated by multiplying all order components included in standard signal X(n) by common filter coefficient W(n).

The case that the active noise reduction device is applied to an environment in the vehicle cabin in which an audio signal is reproduced. When the audio signal is input to signal E(n), because filter coefficient W(n) is updated using the audio signal, there is a risk of attenuating the audio signal. For example, PTLs 1, 2 disclose techniques of solving the problem. In the techniques disclosed in PTLs 1, 2, an update rate is reduced by decreasing step size parameter μ according to an output level of the audio signal, thereby decreasing an influence of an attenuation effect on the audio signal.

CITATION LIST

Patent Literature

PTL 1: Unexamined Japanese Patent Publication No. 3-178845
PTL 2: Unexamined Japanese Patent Publication No. 2008-213755

SUMMARY OF THE INVENTION

The present invention provides an active noise reduction device and an active noise reduction method for being able to reduce a residual abnormal noise in the case of applying the active noise reduction device and the active noise reduction method to an environment in which the audio signal is reproduced.

According to one aspect of the present invention, an active noise reduction device actively reduces a noise at a control point in a vehicle by causing a control sound to interfere with a control target sound that is generated from a noise source and exhibits periodicity. The active noise reduction device includes a standard signal generator, an adaptive filter unit, a control sound output unit, and an error signal detector. The standard signal generator generates a standard signal correlated with the control target sound. The adaptive filter unit generates a control signal based on the standard signal and an audio information feature amount relating to an audio signal reproduced in the vehicle. The control sound output unit outputs a control sound corresponding to the control signal. The error signal detector collects a residual noise caused by interference between the control target sound and the control sound at the control point to detect an error signal corresponding to the residual noise. The adaptive filter unit includes a reference signal generator, a control signal generator, a filter coefficient update unit, and a step size setting unit. The reference signal generator generates a reference signal based on the standard signal input to the adaptive filter unit. The control signal generator multiplies the standard signal by a filter coefficient to generate the control signal. Based on the reference signal and the error signal, the filter coefficient update unit updates the filter coefficient so as to minimize the error signal. The step size determiner sets a step size parameter indicating an update amount of the filter coefficient. The filter coefficient update unit sets a step size adjustment coefficient for adjusting the step size parameter based on the audio information feature amount and a change of the control signal.

According to another aspect of the present invention, an active noise reduction method actively reduces a noise at a control point in a vehicle by causing a control sound to interfere with a control target sound that is generated from a noise source and exhibits periodicity. The active noise reduction method includes (A) a step of generating a standard signal, (B) a step of generating a control signal, (C) a step of outputting the control sound, and (D) a step of detecting an error signal. In (A) the step of generating the standard signal, the standard signal correlated with the control target sound is generated. In (B) the step of generating the control signal, the control signal is generated based on the standard signal and an audio information feature amount relating to an audio signal reproduced in the vehicle. In (C) the step of outputting the control sound, the control sound corresponding to the control signal is output. In (D) the step of detecting the error signal, a residual noise caused by interference between the control target sound and the control sound at the control point is collected to detect the error signal corresponding to the residual noise. (B) the step of generating the control signal includes (B11) a step of generating a reference signal, (B12) a step of generating the control signal, (B13) a step of updating a filter coefficient, and (B14) a step of setting a step size parameter. In (B11) the step of generating the reference signal, the reference signal is generated based on the standard signal to be input. In (B12) the step of generating the control signal, the standard signal is multiplied by the filter coefficient to generate the control signal. In (B13) the step of updating the filter coefficient, the filter coefficient is updated so as to minimize the error signal based on the reference signal and the error signal. In (B14) the step of setting the step size parameter, the step size parameter for controlling an update amount of the filter coefficient is set. In (B13) the step of updating the filter coefficient, a step size adjustment coefficient for adjusting the step size parameter is set based on the audio information feature amount and a change of the control signal.

According to the present invention, the residual abnormal noise can be reduced in the case that the active noise reduction device is applied to the environment in which the audio signal is reproduced.

DESCRIPTION OF EMBODIMENTS

A problem found in the conventional technique will briefly be described prior to description of an exemplary embodiment of the present invention. In techniques disclosed in PTLs 1, 2, because step size parameter μ is decreased according to the output level of the audio signal, an adaptive speed for the audio signal is reduced even if the audio signal at a frequency near control signal Y(n) is used as error signal E(n) to update filter coefficient W(n). On the other hand, in the case that the audio signal is changed to a frequency except for the frequency near control signal Y(n), adaptive processing is performed using decreased step size parameter μ even while the value of filter coefficient W(n) falsely updated by the audio signal is changed to a normal value, which results in a problem in that a generation time of the residual abnormal noise is lengthened.

Figure 1:
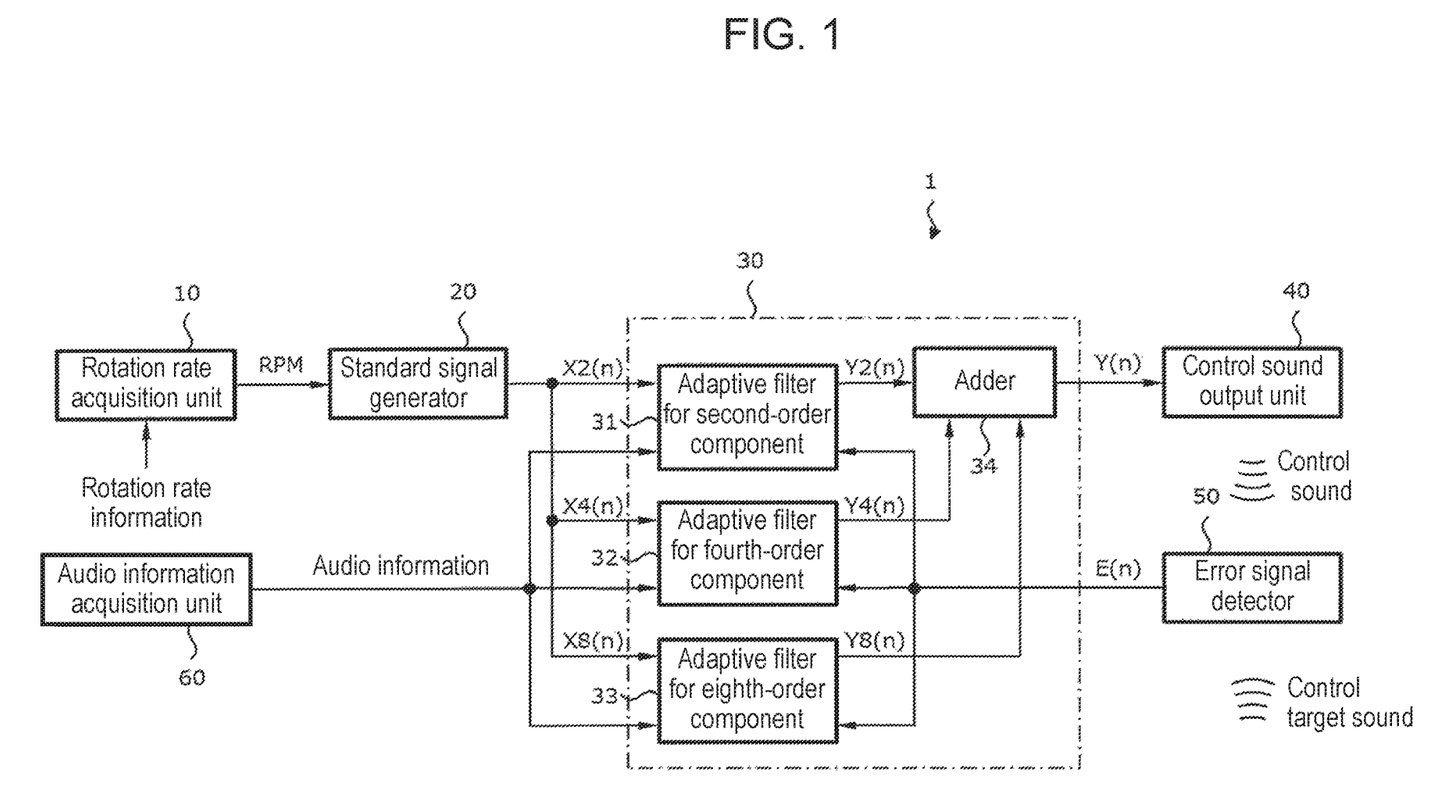
FIG. 1 is a block diagram illustrating an active noise reduction device according to an exemplary embodiment.

The exemplary embodiment of the present invention will be described in detail below with reference to the drawings. FIG. 1 is a view illustrating active noise reduction device 1 of the exemplary embodiment. Active noise reduction device 1 is installed in a vehicle that includes the engine as a driving source. Active noise reduction device 1 reduces the engine booming noise (control target sound) generated in the vehicle cabin due to the engine vibration by causing the control sound having the opposite phase and the identical amplitude to interfere with the engine booming noise.

As illustrated in FIG. 1, active noise reduction device 1 includes rotation rate acquisition unit 10, standard signal generator 20, adaptive filter unit 30, control sound output unit 40, error signal detector 50, and audio information acquisition unit 60.

Rotation rate acquisition unit 10 acquires the rotation rate of the engine based on an engine pulse synchronized with rotation of the engine. For example, the engine pulse is input from an engine rotation sensor (not illustrated) that detects the rotation rate of the engine. Rotation rate acquisition unit 10 outputs rotation rate information RPM about the rotation rate of the engine to standard signal generator 20.

Based on rotation rate information RPM from rotation rate acquisition unit 10, standard signal generator 20 calculates engine vibration frequency f0 (fundamental frequency), and generates standard signal X(n) correlated with the control target sound. For example, standard signal X(n) includes a sine component and a cosine component, and includes a plurality of order components. Hereinafter, a k-order component of standard signal X(n) is represented as Xk(n).

For an in-line 4-cylinder engine, because explosion is generated four times during two revolutions of a crankshaft, an even-numbered harmonic component, namely, a 2N-order component (N is a positive integer) of fundamental frequency f0 becomes a main component of standard signal X(n). In this case, a second-order component (fundamental wave component) and a fourth-order component as well as an eighth-order component (harmonic components) included in the control target sound are set to a control target. That is, standard signal generator 20 generates standard signal X(n) including second-order component X2($n$), fourth-order component X4($n$), and eighth-order component X8($n$), and outputs standard signal X(n) to adaptive filter unit 30. The component of the standard signal is not limited to the even-numbered frequency component of fundamental frequency f0, but can be selected from fundamental frequency f0 and harmonic components of fundamental frequency f0.

For example, when the rotation rate of the in-line 4-cylinder engine is 2,400 rpm, fundamental frequency f0 is 40 Hz. At this point, frequencies f2, f4, f8 of second-order component X2($n$), fourth-order component X4($n$), and eighth-order component X8($n$) of standard signal X(n) are 80 Hz, 160 Hz, 320 Hz, respectively.

Adaptive filter unit 30 generates control signal Y(n) based on standard signal X(n). Control signal Y(n) is a signal corresponding to the control sound that cancels the engine booming noise generated in the vehicle cabin.

Adaptive filter unit 30 includes adaptive filter 31 for the second-order component, adaptive filter 32 for the fourth-order component, adaptive filter 33 for the eighth-order component, and adder 34. That is, the adaptive filter is provided in each order component that becomes the control target.

Adaptive filters 31 to 33 generate second-order component Y2(n), fourth-order component Y4(n), and eighth-order component Y8(n) of control signal Y(n), and output these components to adder 34. For example, each of adaptive filters 31 to 33 is constructed with a 1-tap adaptive filter having a tap length of "1". Adaptive filters 31 to 33 will be described in detailed later.

Adder 34 generates control signal Y(n) by combining order components Y2(n), Y4(n), and Y8(n) output from adaptive filters 31 to 33, and outputs control signal Y(n) to control sound output unit 40.

Control sound output unit 40 includes a speaker disposed at a predetermined position (for example, behind a rear seat) in the vehicle cabin. Control sound output unit 40 converts control signal Y(n) into an analog signal using a DA (digital to analog) converter (not illustrated), and outputs control signal Y(n) from the speaker. The control sound output from control sound output unit 40 is transferred through a transfer line (secondary path) having transfer characteristic C, and reaches the control point. At the control point, the control target sound transferred through a primary path interferes with the control sound transferred through the secondary path, thereby attenuating the control target sound.

Error signal detector 50 includes a microphone disposed near the control point (for example, a ceiling in a center of the vehicle cabin). Error signal detector 50 collects a residual noise, which remains while being not attenuated by the control sound, using the microphone, and outputs error signal E(n) corresponding to the residual noise to adaptive filter unit 30. Adaptive filter unit 30 uses error signal E(n) when updating filter coefficient W(n).

The audio signal is reproduced in the vehicle cabin. For example, the audio signal is a music signal reproduced by a music reproduction device. The audio signal is not limited to the music signal, but may be a voice signal, a sound effect, or an undesired noise, which is reproduced by a radio receiver, navigation device, or a hand-free phone. Although the music signal is illustrated in the exemplary embodiment, the same contents can also be applied to audio signals.

Audio information acquisition unit 60 acquires audio information based on the audio signal reproduced from the music reproduction device. For example, volume information about car audio equipment (not illustrated) or information about an amplitude value of the music signal output from a DSP (Digital Signal Processor) in the car audio equipment is input as the audio information. Audio information acquisition unit 60 outputs the acquired audio information to adaptive filter unit 30.

Figure 2:
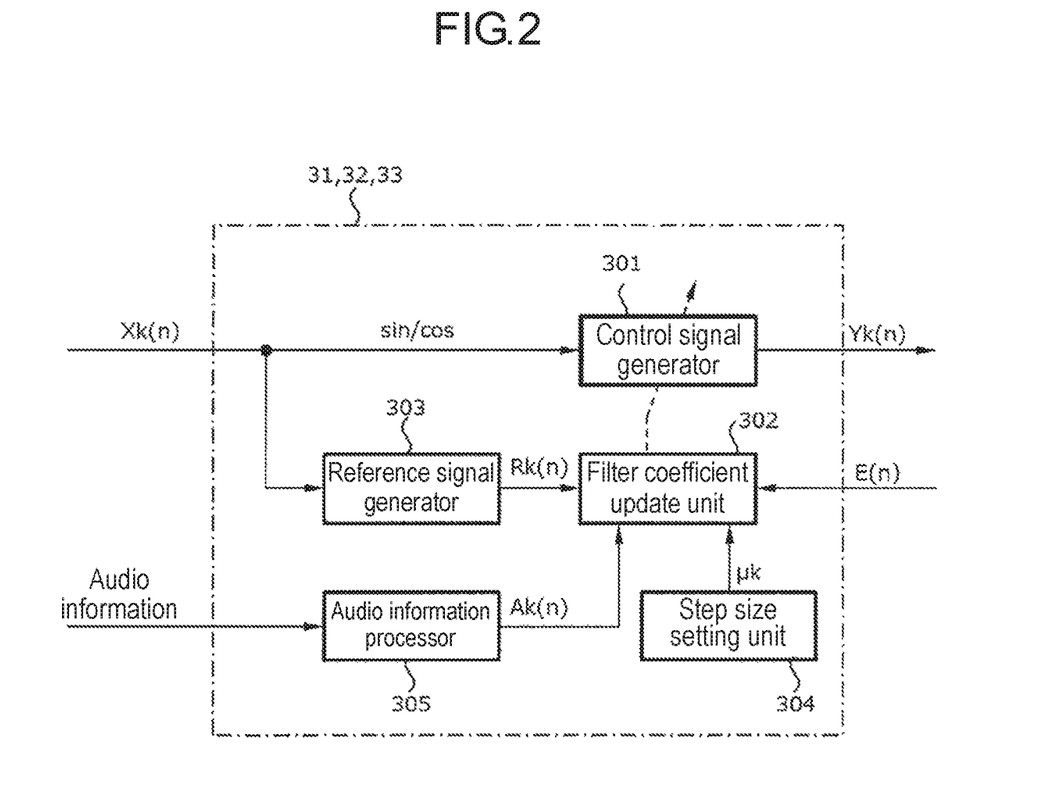
FIG. 2 is a view illustrating a configuration of an adaptive filter.

FIG. 2 is a view illustrating a configuration of each of adaptive filters 31 to 33. In FIG. 2, a symbol affixed with "k" represents a k-order component signal. In the exemplary embodiment, k=2, 4, 8.

As illustrated in FIG. 2, each of adaptive filters 31 to 33 includes control signal generator 301, filter coefficient update unit 302, reference signal generator 303, step size setting unit 304, and audio information processor 305.

Control signal generator 301 generates k-order component Yk(n) of control signal Y(n) by multiplying k-order component Xk(n) of standard signal X(n) by filter coefficient Wk(n). Filter coefficient Wk(n+1) for the k-order component at time (n+1) is given by the following Formula (2).

[Mathematical Formula 2]

$$Wk(n+1)=Wk(n)-\mu k \cdot E(n) \cdot Rk(n) \qquad (2)$$

Thus, in the exemplary embodiment, step size parameter μk is specified in each order component, and filter coefficient Wk(n) is calculated. Adder 34 combines order component Yk(n) output from control signal generator 301, and outputs control signal Y(n).

Reference signal generator 303 generates reference signal Rk(n) based on k-order component Xk(n) of standard signal X(n). For example, a signal in which standard signal X(n) is corrected using transfer characteristic Ĉ (secondary path model) simulating transfer characteristic C of the control sound transfer line (what is called a filtered-X LMS algorithm) is used as reference signal Rk(n).

Step size setting unit 304 sets step size parameter μk controlling an update amount of filter coefficient Wk(n). Step size setting unit 304 sets step size parameter μk for a k-order component based on a frequency fluctuation in k-order component Xk(n) of standard signal X(n).

Audio information processor 305 calculates audio information feature amount Ak(n) based on the audio information from audio information acquisition unit 60. At this point, audio information feature amount Ak(n) is a feature amount calculated for the k-order component. Hereinafter, amplitude information about the k-order component included in the audio information is cited as an example of audio information feature amount Ak(n). As described later, audio information feature amount Ak(n) is not limited to the amplitude information. Audio information feature amount Ak(n) is not particularly limited to the order, and the case of denoting the audio information feature amount for the total degree is represented as A(n).

Filter coefficient update unit 302 successively updates filter coefficient Wk(n) so as to minimize error signal E(n) based on reference signal Rk(n) and error signal E(n). For example, an LMS (Least Mean Square) algorithm that is a kind of steepest descent method can be adopted to an adaptive algorithm in filter coefficient update unit 302. Filter coefficient Wk(n) converges on an optimum value so as to recursively decrease error signal E(n), namely, so as to reduce the residual noise at the control point.

Filter coefficient update unit 302 decides step size adjustment coefficient Vk(n) for step size parameter μk based on a change tendency of k-order component Yk(n) in control signal Y(n) and audio information feature amount Ak(n). Consequently, when reproduced music from the music reproduction device has the large amplitude value, falsely-updated filter coefficient Wk returns to a normal value in a short time by considering the music signal as error signal E(n), and the generation time of the residual abnormal noise can be shortened.

Specifically, when the amplitude information about audio information feature amount Ak(n) becomes greater than or equal to a predetermined threshold, filter coefficient update unit 302 compares absolute values of k-order component Yk(n) in control signal Y(n) and k-order component Yk(n+1) in control signal Y(n+1) of the next sample to each other. When the change of control signal Y(n) tends to decrease as a result of the comparison, order component Vk(n) of step size adjustment coefficient V(n) is set larger than a normal time with respect to step size parameter μk (in Table 1, 2.0), and the filter coefficient is updated using step size adjustment coefficient Vk(n). Consequently, the update amount of a next sample is increased. At this point, the step size adjustment coefficient at the normal time is set to 1.0.

For example, filter coefficient update unit 302 selects step size adjustment coefficient Vk(n) by which step size parameter μk is multiplied according to Table 1. That is, according to Table 1, when control signal Y(n) tends to decrease while audio information feature amount Ak(n) becomes greater than or equal to the threshold, order component Vk(n) of step size adjustment coefficient V(n) is set to 2.0. The update amount of filter coefficient Wk(n) is doubled because step size parameter μk is multiplied by order component Vk(n). Thus, a follow-up rate of the adaptive filter is enhanced.

TABLE 1

| Determination based on control signal Yk(n) | Determination based on audio information feature amount Ak(n) | Step size adjustment coefficient Vk(n) |
| --- | --- | --- |
| Decreasing tendency | Greater than or equal to threshold | 2.0 |
| Decreasing tendency | Less than threshold | 1.0 |
| Increasing tendency | — | 1.0 |

For example, when the rotation rate of the in-line 4-cylinder engine is 2400 rpm, fundamental frequency f0 is 40 Hz and second-order component f2 is 80 Hz. At this point, when music reproduction device reproduces the signal including the frequency component of 80 Hz, the filter coefficient W2 is updated while the signal from the music reproduction device is reflected on error signal E(n). It is assumed that the signal including the frequency component of 80 Hz output from the music reproduction device is changed to the music signal that includes the frequency component of 50 Hz without changing the amplitude after filter coefficient W2 is falsely updated for a long time. In this case, because the value of filter coefficient W2 is updated in the decreasing tendency, the absolute values of second-order component Y2(n) in control signal Y(n) and second-order component Y2(n+1) in control signal Y(n+1) of the next sample tend to decrease when being compared to each other. When control signal Y(n) tends to decrease while audio information feature amount Ak(n) is greater than or equal to the threshold, step size parameter μ2 is multiplied by step size adjustment coefficient V2(n) enhancing the follow-up rate. Consequently, the filter coefficient can be changed to the value for the normal state (that is, the state in which the music signal is not included in the input signal of error signal detector 50) in a short time. As a result, the generation time of the residual abnormal noise of 80 Hz can be shortened. In the exemplary embodiment, the adjustment of the step size parameter is performed on the adaptive filter of each order component.

As described above, active noise reduction device 1 of the exemplary embodiment actively reduces the noise at the control point by causing the control sound to interfere with the control target sound that is generated from a noise source and exhibits periodicity. Active noise reduction device 1 includes standard signal generator 20, adaptive filter unit 30, control sound output unit 40, and error signal detector 50. Standard signal generator 20 generates standard signal X(n) that is correlated with the control target sound and includes a plurality of order components Xk(n). Adaptive filter unit 30 generates control signal Y(n) based on standard signal X(n) and the audio information. Control sound output unit 40 outputs a control sound corresponding to control signal Y(n). Error signal detector 50 collects a residual noise caused by interference between the control target sound and the control sound at the control point to detect error signal E(n) corresponding to the residual noise. Adaptive filter unit 30 includes the plurality of adaptive filters 31 to 33 corresponding to the plurality of order components Xk(n) and adder 34 that generates control signal Y(n) by combining order components Yk(n) output from the plurality of adaptive filters 31 to 33. In active noise reduction device 1, each of the plurality of adaptive filters 31 to 33 includes reference signal generator 303, control signal generator 301, filter coefficient update unit 302, step size setting unit 304, and audio information processor 305. Reference signal generator 303 generates reference signal Rk(n) based on order component Xk(n) of standard signal X(n) input to the adaptive filter. Control signal generator 301 generates order component Yk(n) of control signal Y(n) by multiplying order component Xk(n) of standard signal X(n) by filter coefficient Wk(n). Filter coefficient update unit 302 updates filter coefficient Wk(n) so as to minimize error signal E(n) based on reference signal Rk(n) and error signal E(n). Step size setting unit 304 sets step size parameter μk controlling the update amount of filter coefficient Wk(n). Audio information processor 305 calculates the audio information feature amount based on the audio information input to the adaptive filter.

Filter coefficient update unit 302 calculates order component Vk(n) of step size adjustment coefficient V(n) based on the change of order component Yk(n) of control signal Y(n) and audio information feature amount Ak(n). Step size parameter μk is adjusted using calculated order component Vk(n) of step size adjustment coefficient.

An active noise reduction method of the exemplary embodiment includes the following processes, and actively reduces the noise at the control point by causing the control sound to interfere with the control target sound that is generated from the noise source and exhibits the periodicity. That is, the active noise reduction method includes a process (A) of generating standard signal X(n), a process (B) of generating control signal Y(n), a process (C) of outputting the control sound, and a process (D) of detecting error signal E(n). In the process (A) of generating standard signal X(n), standard signal X(n) that is correlated with the control target sound and includes the plurality of order components is generated. In the process (B) of generating control signal Y(n), control signal Y(n) is generated based on standard signal X(n) and the audio information. In the process (C) of outputting the control sound, the control sound corresponding to control signal Y(n) is output. In the process (D) of detecting error signal E(n), the residual noise caused by interference between the control target sound and the control sound at the control point is collected to detect error signal E(n) corresponding to the residual noise. The process (B) includes a process (B1) of generating order component Yk(n) of control signal Y(n) in each of the plurality of order components k and a process (B2) of generating control signal Y(n) by combining order components Yk(n). The process (B1) of generating order component Yk(n) of control signal Y(n) in each of the plurality of order components k includes a process (B11) of generating reference signal Rk(n), a process (B12) of generating order component Yk(n) of control signal Y(n), a process (B13) of updating filter coefficient Wk(n), a process (B14) of setting step size parameter μk, and a process (B15) of calculating the audio information feature amount. In the process (B11) of generating reference signal Rk(n), reference signal Rk(n) is generated based on input order component k of standard signal X(n). In the process (B12) of generating order component Yk(n) of control signal Y(n), order component Yk(n) of control signal Y(n) is generated by multiplying order component Xk(n) of standard signal X(n) by filter coefficient Wk(n). In the process (B13) of updating filter coefficient Wk(n), filter coefficient Wk(n) is updated such that error signal E(n) is minimized based on reference signal Rk(n) and error signal E(n). In the process (B14) of setting step size parameter μk, step size parameter μk controlling the update amount of filter coefficient Wk(n) is set. In the process (B15) of calculating the audio information feature amount, the audio information feature amount is calculated based on the audio information input to the adaptive filter.

In the process (B13), order component Vk(n) of step size adjustment coefficient V(n) is calculated based on control signal Y(n) and audio information feature amount Ak(n). Step size parameter μk is adjusted using calculated order component Vk(n) of the step size adjustment coefficient.

In active noise reduction device 1 and the active noise reduction method of the exemplary embodiment, by the changes of audio information feature amount A(n) and control signal Y(n), step size parameter μk is suitably set in each order component of the control target sound, and filter coefficient Wk(n) is calculated using set step size parameter μk. For this reason, even if the amplitude of the frequency of the music signal fluctuates, the effect that reduces a loss of the music signal can stably be obtained while the effect that reduces the residual noise is obtained.

Other Exemplary Embodiments

Other exemplary embodiments will be described below.

For example, filter coefficient update unit 302 may set step size adjustment coefficient Vk(n) according to Table 2. As in Table 2, when order component Yk(n) of control signal Y(n) tends to increase while audio information feature amount Ak(n) is greater than or equal to the threshold, an update rate may be decreased by setting a value smaller than the normal time (in Table 2, 0.5) to order component Vk(n) of step size adjustment coefficient V(n). Table 2 illustrates a setting example of the step size adjustment coefficient. According to Table 2, when control signal Y(n) tends to increase while audio information feature amount Ak(n) becomes greater than or equal to the threshold, order component Vk(n) of step size adjustment coefficient V(n) is set to 0.5. At this point, filter coefficient Wk(n) becomes −6 dB, and the update amount is decreased (the follow-up rate is decreased). Consequently, when the music signal that is output from the music reproduction device and includes a component in a control target frequency band starts to be input to the error signal detector, a degree in which the filter coefficient update unit falsely updates the filter coefficient can be reduced.

TABLE 2

| Determination based on control signal Yk(n) | Determination based on audio information feature amount Ak(n) | Step size adjustment coefficient Vk(n) |
| --- | --- | --- |
| Decreasing tendency | — | 1.0 |
| Increasing tendency | Less than threshold | 1.0 |
| Increasing tendency | Greater than or equal to threshold | 0.5 |

In the exemplary embodiment of Table 1, filter coefficient update unit 302 determines order component Vk(n) of step size adjustment coefficient V(n) using the one-stage threshold. Alternatively, as in Table 3, audio information feature amount Ak(n) may be determined using a plurality of thresholds (threshold 1 to threshold 4).

TABLE 3

| Determination based on control signal Yk(n) | Determination based on audio information feature amount A(n) | Step size adjustment coefficient Vk(n) |
| --- | --- | --- |
| Decreasing tendency | Greater than or equal to threshold 3 and less than threshold 4 | 8.0 |
| Decreasing tendency | Greater than or equal to threshold 2 and less than threshold 3 | 4.0 |
| Decreasing tendency | Greater than or equal to threshold 1 and less than threshold 2 | 2.0 |
| Decreasing tendency | Less than threshold 1 | 1.0 |
| Increasing tendency | — | 1.0 |

A step size adjustment proportionality constant may be set to seamlessly calculate step size adjustment coefficient Vk(n) with respect to audio information feature amount Ak(n).

In the exemplary embodiment, the amplitude information about each frequency of the audio information is used as a determination value with respect to audio information feature amount Ak(n). Alternatively, for example, an average amplitude value for all the frequencies of the audio information, a feature amount extracted according to the frequency of the audio information, phase information about the audio information, or volume information about the music reproduction device may be used as the determination value.

In the exemplary embodiment, the adaptive filter acquires the audio information to calculate audio information feature amount A(n). Alternatively, audio information feature amount A(n) may be received from the music reproduction device or an external device. That is, audio information processor 305 may be eliminated from the adaptive filter. In this case, the process in which the adaptive filter calculates the audio information feature amount based on the audio information is also eliminated.

In the exemplary embodiment, by way of example, the filter coefficient update unit updates the filter coefficient using audio information feature amount Ak(n) calculated in each k-order component. The present invention is not limited to the exemplary embodiment, but a method for updating the filter coefficient using audio information feature amount A(n) for all the frequency bands can also be adopted. When the method is adopted, audio information processor 305 needs not to perform frequency analysis on each k-order component, so that a processing amount can be decreased in the adaptive filter unit.

Adaptive filter unit 30 may include a stabilizer that stabilizes error signal E(n). For example, the stabilizer generates a signal in which control signal Y(n) is corrected using transfer characteristic C^ (secondary path model) simulating transfer characteristic C of the control sound transfer system, and combines the corrected signal with error signal E(n). Consequently, the stability can be improved even if the noise at a control point includes a noise caused by an external factor except for the control target sound.

In addition to filter coefficient update unit 302, adaptive filter unit 30 may include a second filter coefficient update unit that updates the filter coefficient based on standard signal X(n) and control signal Y(n).

In the exemplary embodiment, the plurality of adaptive filters are provided according to each order component of the standard signal, and the plurality of adaptive filters adjust step size parameter µk in each order component. Alternatively, only one adaptive filter is provided according to one of the plurality of order components including the fundamental frequency, and step size parameter µk of the one may be adjusted. In this case, the adder that combines the outputs of the plurality of adaptive filters and the process of combining the outputs of the plurality of adaptive filters can be eliminated.

In the exemplary embodiment, in detecting the change of control signal Y(n), the absolute values of control signal Y(n) and successive control signal Y(n+1) of the next sample are compared to each other, and the increasing or decreasing tendency is determined from the increasing or decreasing amount. However, the method for detecting the change of control signal Y(n) is not limited to the exemplary embodiment. For example, control signals Y(n) of two un-successive samples may be used. Alternatively, control signals Y(n) of at least three samples are used, and the increasing or decreasing tendency may be determined based on a rate of change.

A whole or a part of the device of the exemplary embodiment, or a whole or a part of the functional block illustrated in the functional block diagram of FIGS. 1 and 2 may be implemented by one or at least one electronic circuit including a semiconductor device, an IC (Integrated Circuit), or an LSI (Large Scale Integration). The LSI or the IC may be integrated in one chip, or constructed by combining a plurality of chips. In this case, although the term LSI or IC is used, the term is changed according to a degree of integration. Sometimes the term system LSI, Very Large Scale Integration (VLSI), or Ultra Large Scale Integration (ULSI) is used. A whole or a part of function or operation of the device of the exemplary embodiment can be implemented by a computer program. A computer includes a Central Processing Unit (CPU), and the program is recorded in a non-transiently recording medium such as a Read Only Memory (ROM), an optical disk, and a hard disk drive. The CPU calls and executes the program stored in the non-transiently recording medium, thereby implementing each function or operation.

It should be considered that the exemplary embodiment is illustrative in all aspects, and are not restrictive. The scope of the present invention is represented by not the above description, but the claims, and it is intended that all modifications within the sense and scope equivalent to the claims are involved in the scope of the present invention.

INDUSTRIAL APPLICABILITY

The present invention is suitable for the active noise reduction device and the active noise reduction method that are used to actively reduce the engine booming noise generated in the vehicle cabin due to the engine vibration.

REFERENCE MARKS IN THE DRAWINGS 1 active noise reduction device
10 rotation rate acquisition unit
20 standard signal generator
30 adaptive filter unit
31, 32, 33 adaptive filter
34 adder
40 control sound output unit
50 error signal detector
60 audio information acquisition unit
301 control signal generator
302 filter coefficient update unit
303 reference signal generator
304 step size setting unit
305 audio information processor

The invention claimed is:

1. An active noise reduction device that actively reduces a noise at a control point in a vehicle by causing a control sound to interfere with a control target sound, the control target sound being generated from a noise source and exhibiting periodicity, the active noise reduction device comprising:
 a standard signal generator that generates and outputs a standard signal correlated with the control target sound;
 an adaptive filter circuit that generates a control signal based on the standard signal outputted and an audio information feature amount relating to an audio signal reproduced in the vehicle;
 a control sound output circuit that outputs a control sound corresponding to the control signal; and
 an error signal detector that collects a residual noise caused by interference between the control target sound and the control sound at the control point, and outputs an error signal corresponding to the residual noise,
 wherein
 the adaptive filter circuit includes:
  a reference signal generator that generates a reference signal based on the standard signal input to the adaptive filter circuit;
  a control signal generator that generates the control signal by multiplying the standard signal by a filter coefficient;
  a step size setting circuit that sets a step size parameter for controlling an update amount of the filter coefficient; and
  a filter coefficient update circuit that sets a step size adjustment coefficient to adjust the step size parameter for controlling the update amount of the filter coefficient based on the audio information feature amount and a change of the control signal, and updates the filter coefficient so as to reduce the residual noise using the step size adjustment coefficient based on the reference signal and the error signal,
 wherein the filter coefficient update circuit adjusts the step size parameter using the step size adjustment coefficient set to decrease the step size parameter, when the audio information feature amount exceeds a threshold while an order component of the control signal tends to increase.

2. The active noise reduction device according to claim 1, wherein
 the adaptive filter circuit includes a plurality of adaptive filters corresponding to a plurality of order components of the standard signal, and
 each of the plurality of adaptive filters generates the control signal of a corresponding order component of the order components.

3. The active noise reduction device according to claim 1, wherein the filter coefficient update circuit adjusts the step size parameter using the step size adjustment coefficient set to increase the step size parameter, when the audio information feature amount exceeds a threshold while an order component of the control signal tends to decrease.

4. The active noise reduction device according to claim 1, wherein the audio information feature amount includes at least one of amplitude information about the audio signal, an amplitude value in each frequency of the audio signal, a feature amount extracted according to a frequency of the audio signal, phase information about the audio signal, and volume information about an audio reproduction device that reproduces the audio signal.

5. The active noise reduction device according to claim 1, wherein
the filter coefficient update circuit that updates the filter coefficient so as to minimize the error signal based on the reference signal and the error signal.

6. An active noise reduction method for actively reducing a noise at a control point in a vehicle by causing a control sound to interfere with a control target sound, the control target sound being generated from a noise source and exhibiting periodicity, the active noise reduction method comprising:
generating a standard signal correlated with the control target sound;
generating a control signal based on the standard signal and an audio information feature amount relating to an audio signal reproduced in the vehicle;
outputting a control sound corresponding to the control signal; and
collecting a residual noise caused by interference between the control target sound and the control sound at the control point, and outputting an error signal corresponding to the residual noise,
wherein when generating the control signal:
generating a reference signal based on the standard signal;
generating the control signal by multiplying the standard signal by a filter coefficient;
setting a step size adjustment coefficient for adjusting a step size parameter based on the audio information feature amount and a change of the control signal, deciding an update amount of the filter coefficient so as to reduce the residual noise based on the reference signal, the error signal, and the step size parameter adjusted using the step size adjustment coefficient, and updating the filter coefficient;
setting the step size parameter for controlling the update amount of the filter coefficient; and
when the audio information feature amount exceeds a threshold while an order component of the control signal tends to increase:
adjusting the step size parameter using the step size adjustment coefficient set to decrease the step size parameter.

7. An active noise reduction device that actively reduces a noise at a control point in a vehicle by causing a control sound to interfere with a control target sound, the control target sound being generated from a noise source and exhibiting periodicity, the active noise reduction device comprising:
a standard signal generator that generates and outputs a standard signal correlated with the control target sound;
an adaptive filter circuit that generates a control signal based on the standard signal outputted and an audio information feature amount relating to an audio signal reproduced in the vehicle;
a control sound output circuit that outputs a control sound corresponding to the control signal; and
an error signal detector that collects a residual noise caused by interference between the control target sound and the control sound at the control point, and outputs an error signal corresponding to the residual noise,
wherein
the adaptive filter circuit includes:
a reference signal generator that generates a reference signal based on the standard signal input to the adaptive filter circuit;
a control signal generator that generates the control signal by multiplying the standard signal by a filter coefficient;
a step size setting circuit that sets a step size parameter for controlling an update amount of the filter coefficient; and
a filter coefficient update circuit that sets a step size adjustment coefficient to adjust the step size parameter for controlling the update amount of the filter coefficient based on the audio information feature amount and a change of the control signal, and updates the filter coefficient so as to reduce the residual noise using the step size adjustment coefficient based on the reference signal and the error signal,
wherein the filter coefficient update circuit adjusts the step size parameter using the step size adjustment coefficient set to increase the step size parameter, when the audio information feature amount exceeds a threshold while an order component of the control signal tends to decrease.

* * * * *